(12) United States Patent
Kobayashi et al.

(10) Patent No.: US 10,072,170 B2
(45) Date of Patent: Sep. 11, 2018

(54) INK SET AND INK-JET RECORDING METHOD

(71) Applicants: Hikaru Kobayashi, Yokohama (JP); Tomohiro Nakagawa, Sagamihara (JP); Noriaki Okada, Yokohama (JP)

(72) Inventors: Hikaru Kobayashi, Yokohama (JP); Tomohiro Nakagawa, Sagamihara (JP); Noriaki Okada, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/070,193

(22) Filed: Mar. 15, 2016

(65) Prior Publication Data
US 2016/0272834 A1     Sep. 22, 2016

(30) Foreign Application Priority Data

Mar. 20, 2015   (JP) .................. 2015-057817

(51) Int. Cl.
| | | |
|---|---|---|
| *C09D 11/40* | (2014.01) | |
| *C09D 11/033* | (2014.01) | |
| *C09D 11/322* | (2014.01) | |
| *C09D 11/38* | (2014.01) | |
| *C09D 11/102* | (2014.01) | |

(52) U.S. Cl.
CPC ............ *C09D 11/40* (2013.01); *C09D 11/033* (2013.01); *C09D 11/102* (2013.01); *C09D 11/322* (2013.01); *C09D 11/38* (2013.01)

(58) Field of Classification Search
USPC .......................................... 347/100
See application file for complete search history.

(56) References Cited

U.S. PATENT DOCUMENTS

| | | | | |
|---|---|---|---|---|
| 5,365,322 A * | 11/1994 | Hamada | ................. | G03G 15/70 271/259 |
| 7,393,094 B2 * | 7/2008 | Taguchi | ............... | C09D 11/328 106/31.27 |
| 7,776,145 B2 * | 8/2010 | Doi | ........................ | C09D 11/40 106/31.6 |
| 8,118,424 B2 * | 2/2012 | Irita | ....................... | C09D 11/40 347/100 |
| 8,342,670 B2 * | 1/2013 | Arai | ...................... | C09D 11/54 347/100 |
| 8,702,220 B2 * | 4/2014 | Bhatt | ................... | C09D 11/322 347/100 |
| 8,883,275 B2 * | 11/2014 | Nagashima | .............. | B41M 5/52 106/31.43 |
| 2005/0004263 A1 * | 1/2005 | Gould | ................... | C09D 11/322 523/160 |
| 2005/0012796 A1 * | 1/2005 | Doi | ........................ | C09D 11/30 347/100 |
| 2006/0047013 A1 * | 3/2006 | Ito | .......................... | C09D 11/30 523/160 |

(Continued)

*Primary Examiner* — Matthew Luu
*Assistant Examiner* — Lily Kemathe
(74) *Attorney, Agent, or Firm* — Oblon, McClelland, Maier & Neustadt, L.L.P.

(57) ABSTRACT

An ink set that includes a first ink and a second ink each containing coloring agent, surfactant, organic solvent, resin, and water. The mix SP value of the organic solvent and the water of the first ink is larger than the mix SP value of the organic solvent and the water of the second ink. An ink-jet recording method using the ink set.

17 Claims, 2 Drawing Sheets

(56) References Cited

U.S. PATENT DOCUMENTS

| | | | | |
|---|---|---|---|---|
| 2006/0238588 A1* | 10/2006 | Lee | C09D 11/40 | 347/100 |
| 2007/0146454 A1* | 6/2007 | Doi | C09D 11/40 | 347/100 |
| 2007/0225403 A1* | 9/2007 | Lee | C09D 11/40 | 523/160 |
| 2009/0234067 A1* | 9/2009 | Kariya | C09D 11/32 | 524/599 |
| 2010/0033524 A1* | 2/2010 | Arai | C09D 11/324 | 347/9 |
| 2010/0201737 A1* | 8/2010 | Kariya | C09D 11/32 | 347/21 |
| 2011/0050795 A1* | 3/2011 | Arai | C09B 67/0013 | 347/28 |
| 2011/0148980 A1* | 6/2011 | Arai | C09D 11/36 | 347/21 |
| 2012/0207983 A1* | 8/2012 | Matsuyama | C09D 11/328 | 428/195.1 |
| 2012/0229559 A1* | 9/2012 | Matsushita | C09D 11/322 | 347/21 |
| 2013/0002776 A1* | 1/2013 | Nagashima | B41M 5/52 | 347/100 |
| 2014/0092168 A1* | 4/2014 | Ito | C09D 11/101 | 347/21 |
| 2015/0115202 A1* | 4/2015 | Kagata | C09D 11/322 | 252/301.36 |
| 2015/0328900 A1* | 11/2015 | Kitada | C09D 11/322 | 347/21 |
| 2016/0177116 A1* | 6/2016 | Katsuragi | C09D 11/324 | 347/102 |
| 2016/0272832 A1* | 9/2016 | Kobayashi | C09D 11/102 | |

* cited by examiner

INK SET AND INK-JET RECORDING METHOD

REFERENCE TO PRIOR APPLICATIONS

This application claims priority to Japanese patent application JP2015-057817 filed Mar. 20, 2015, incorporated herein by reference.

TECHNICAL FIELD

An ink set and an ink-jet method are described, as are ancillary features, aspects, and benefits thereof. Additional objects, advantages and other features will be set forth in part in the description that follows and in part will become apparent to those having ordinary skill in the art upon examination of the following or may be learned from the practice of the described embodiments. The advantages of what is described herein may be realized and obtained as particularly pointed out in the appended claims. In this regard, the description herein is to be understood as illustrative in nature, and not as restrictive.

BACKGROUND

Ink-jet printers are used for, e.g., displays, posters and bulletin boards. Non-porous recording media such as plastics are mainly used for industry use, and inks for such a use are being developed. Solvent ink-jet inks including a resin dissolved in a vehicle such as an organic solvent, and ultra-violet curable resin ink-jet inks including a polymerizable monomer as a main component, are used as ink-jet recording inks for industry use. However, water based inks, which have been widely used for home use and which are favorable in terms of their low environmental impact, are being developed for industry use.

Examples of non-porous recording media for industry use include non-transparent substrates such as PVC (polyvinyl chloride), and tarpaulin, and transparent substrates such as PET (polyethylene telephthalate), PP (polypropylene), and PE (polyethylene). However, a recording medium printed with a monolayer does not come out well due to shadowing on the other side when printing on transparent substrates. Multiple layer printing, which is printing over a prior printed substrate, is also used. However, multiple layer printing has a problem in that image cissing occurs when printing an upper layer over a lower ink layer. To resolve this problem, a different amount of surfactant is added in each of the upper layer and the lower layer (see Patent literature 1: Japanese Patent Application Laid-Open Publication No 2013-828852).

SUMMARY

An object herein is to provide an ink set which can produce excellent image quality with high gloss and without blurs or beading in printing on a substrate or on a lower ink layer.

The inventors herein studied a method of multilayer printing by using an ink set composed of inks 1 and 2 including various kinds of water soluble organic solvents each having a particular mix SP value (Solubility Parameter). Consequently, it was found that blurs are reduced by printing in ink having small mix SP value over an ink layer formed of ink having a larger mix SP value. High image quality can be obtained even on difficult substrates by using the ink having the small mix SP value over an ink layer formed of the ink having the larger mix SP value.

Described herein is an ink set comprising a first ink preferably used for an under layer printing and a second ink preferably used for upper layer printing, the first ink and the second ink each individually and independently comprising:
a coloring agent,
a surfactant,
an organic solvent,
a resin, and
water,
wherein the content of the surfactant is independently from 1 to 5 mass % with respect to the total mass of each of the first and second inks;
wherein the surface tension of each of the first and second inks is independently in a range of 15-30 N/m; and
wherein the SP value of a mixture of the organic solvent and the water of the first ink is larger than the SP value of the mixture of the organic solvent and the water of the second ink.

The present ink set and process provides high quality images having high glossiness but not having blurs or beading in printing on a substrate or on a lower ink of a lower layer.

DETAILED DESCRIPTION OF THE PREFERRED EMBODIMENTS

Figure 1:
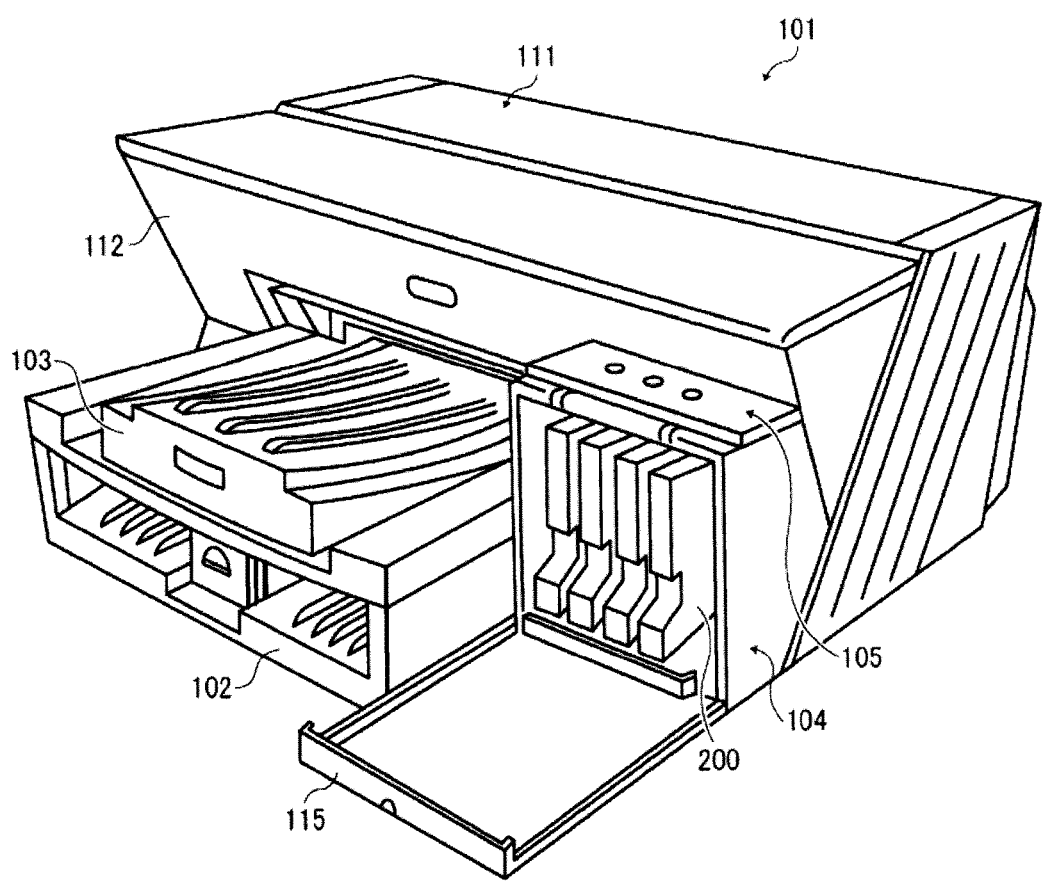
FIG. 1 is a schematic diagram illustrating an example of a serial type ink jet recording device.

The present ink set, method, etc. is further described below in a nonlimiting way by way of independent, preferred embodiments:
a) the surfactant is silicone surfactant.
b) the resin is urethane resin.
c) the organic solvent includes an amide base organic solvent.
d) a method comprising adding, applying, printing, recording etc. the first ink of the ink set herein to a surface of a recording medium, and adding, applying, printing, recording etc. the second ink of the ink set herein on the first ink, for example by using thermal energy or mechanical energy to apply, etc. the second ink.

An ink set herein includes ink 1 preferably intended for a lower layer and ink 2 preferably intended for an upper layer. In the present ink set, the SP value of mix of the organic solvent and the water of the ink 1 is larger than the SP value of mix of the organic solvent and the water of the ink 2, and consequently affinity between the ink 1 and the ink 2 is decreased, excessive wetting spreading can be suppressed, and a high quality image without blurs can be obtained in multiple layer printing. The difference in the SP value between the ink 1 and the ink 2 is preferably 1.0 or more. When the difference in the SP is 1.0 or more, excessive wetting spreading of the ink 2 over the ink 1 can be suppressed more effectively, then blurs can be suppressed. The difference in the mix SP value between the ink 1 and the ink 2 is preferably 2.0 or more, more preferably 2.75, 3.0, 3.25, 3.5, 3.75 or 4.0 or more. The difference in the SP value between the ink 1 and the ink 2 is not limited but generally less than 6.0

The SP value of an organic solvent can be obtained by separating solids with a centrifugal separator, analyzing components of the organic solvent with GC-MS, and investigating kinds and contents of the components. The SP value of the components can be identified with reference to the literature: C. M. Hansen: J. Paint Tech., 39(505), 104-117 (1967).

The mix SP value (δm) of an ink as described herein can be calculated by the following formula X using the SP values of the organic solvent(s) and water included in the ink.

$$\delta m = \delta 1 \varphi 1 + \delta 2 \varphi 2 + \ldots + \delta N \varphi N \text{(N is a natural number)} \quad \quad X:$$

δ1, δ2, δN: SP value of each solvent components
φ1, φ2, φN: volume fraction of each solvent components The mix SP value is calculated using the numerical value of solvent components included in the ink at 3 mass % or more other than the surfactant. The ink 1 and the ink 2 (hereinafter these may be called ink) each independently include coloring agent, surfactant, organic solvent, resin, and water.

Preferred mix SP values for inks 1 and 2 herein are not generally limited and can be, for example, from 2-75, preferably 5-60, more preferably 25-40, including 10-50, 15-45, 30-40, etc., including all values and ranges between 2 and 75 such as 28, 32, 34, 36, 38, 42, 44, etc.

Coloring Agent

A coloring agent is included for coloring the ink and improving image density. The coloring agent for each color (e.g. black, magenta, cyan, yellow, and white) are selected and used to obtain desired color ink. There is no specific limit for kinds of the coloring agent, and inorganic pigments, organic pigments, hollow resin particles, and dyes, etc. can be used as the coloring agent. These coloring agents can be used independently or in combination. The content of coloring agent in the ink is preferably from 0.1 mass % to 10 mass %, and more preferably from 1 mass % to 10 mass % in terms of improvement of the image density, high fixability and discharging stability.

The pigment preferably has a surface area of from about 10 $m^2/g$ to about 1500 $m^2/g$, more preferably from about 20 $m^2/g$ to about 600 $m^2/g$, further more preferably from about 50 $m^2/g$ to about 300 $m^2/g$. To obtain the pigment having desired surface area, reducing the size or smashing treatment (e.g. ball mill crushing, jet mill crushing, and ultrasonic treatment) can be used for making the pigment small. The volume mean diameter (D50) of the pigment in the ink is preferably from 10 nm to 300 nm, more preferably from 20 nm to 250 nm in terms of pigment disperse stability, discharge stability, image density, and productivity of the ink. D50 is a value measured by the Dynamic light scattering at 23° C., 55% RH with Microtrac UPA manufactured by NIKKISO CO., LTD.

Further, the diameter of the hollow resin particle is preferably from 200 nm to 1000 nm, more preferably from 300 nm to 800 nm in terms of concealing of printed image and preventing ink clogging at ink flow channel or ink-jet head provided in an image forming device.

Specific examples of the inorganic pigment include titanium oxide, iron oxide, calcium carbonate, barium sulfate, aluminum hydroxide, barium yellow, cadmium red, chrome yellow, and carbon black made by well-known process (e.g. contact method, furnace method, and thermal method). Specific examples of the organic pigment include azo pigment (e.g. azo lake pigment, insoluble azo pigment, condensed azo pigment, and chelate azo pigment), polycyclic pigment (e.g. phthalocyanine pigment, perylene pigment, perinone pigment, anthraquinone pigment, quinacridone pigment, dioxazine pigment, indigo pigment, thioindigo pigment, isoindolinone pigment, quinophthalone pigment), dye chelate (e.g. basic dye chelate and acid dye chelate), nitro pigment, nitroso pigment, and aniline black. Pigment having high affinity for a solvent is preferably used. The most preferable example of black pigment is carbon black (C. I. Pigment Black 7). Specific examples of black pigment include Regal, Black Pearls, Elftex, Monarch, Mogul and carbon black being available from Cabot Corporation as product name of Vulcan (e.g. Black Pearls 2000, 1400, 1300, 1100, 1000, 900, 880, 800, 700, 570, Black Pearls L, Elftex 8, Monarch 1400, 1300, 1100, 1000, 900, 880, 800, 700, Mogul L, Regal 330, 400, 660, Vulcan P), SENSIJET Black SDP 100 (SENSIENT), SENSIJET SDP 1000 (SENSIENT), and SENSIJET Black SDP 2000 (SENSIENT).

Specific examples of color pigment include C.I. pigment yellow 1, 3, 12, 13, 14, 17, 24, 34, 35, 37, 42 (Yellow iron oxide), 53, 55, 74, 81, 83, 95, 97, 98, 100, 101, 104, 108, 109, 110, 117, 120, 128, 139, 150, 151, 155, 153, 180, 183, 185, and 213, C.I. pigment orange 5, 13, 16, 17, 36, 43, and 51, C.I. pigment red 1, 2, 3, 5, 17, 22, 23, 31, 38, 48:2, 48:2 (Permanent red 2B(Ca)), 48:3, 48:4, 49:1, 52:2, 53:1, 57:1 (Brilliant carmine 6B), 60:1, 63:1, 63:2, 64:1, 81, 83, 88, 101 (Bengala), 104, 105, 106, 108 (Cadmium red), 112, 114, 122 (Quinacridone magenta), 123, 146, 149, 166, 168, 170, 172, 177, 178, 179, 185, 190, 193, 209, and 219, C.I. pigment violet 1 (Rhodamine lake), 3, 5:1, 16, 19, 23, and 38, C.I. pigment blue 1,2, 15 (Phthalocyanine blue), 15:1, 15:2, 15:3 (Phthalocyanine blue), 15:4, 16, 17:1, 56, 60, and 63, and C.I. pigment green 1, 4, 7, 8, 10, 17, 18, and 36.

Hollow resin particles can be used as coloring agent, for example in manufacturing white ink. There is no specific limit for the hollow resin particle, and conventional hollow resin particle can be used as the hollow resin particle. Specific examples of the hollow resin particle on the market include styrene-acryl resin such as MHSO55 (manufactured by Zeon Corporation.), ROPAQUE OP-62, OP-84J, OP-91, HP-1055, HP-91, and ULTRA (manufactured by Rohm & Hass Co.), and cross-linking styrene-acryl resin such as SX-863(A), SX-864(B), SX-866(A), SX-866(B), SX-868 (manufactured by JSR Corporation), ROPAQUE ULTRA E, and ULTRA DUAL (manufactured by Rohm & Hass Co.).

When a pigment is used as the coloring agent, it is preferable that mean particle diameter of the pigment included in the lower layer ink is larger than mean particle diameter of the pigment included in the upper layer ink. By this, space between the pigments can be filled, and then the layers can be flatter and high glossiness can be obtained. Specific examples of a method to disperse the coloring agent in the ink include a method using a surfactant, a method using a dispersible resin, a method using a pigment coated with a resin, and a method using self-dispersible resin which is introduced a hydrophilic functional group onto a pigment surface.

Surfactant

Surfactant is included in the ink to provide wettability for a recording medium. The content of the surfactant included in the ink is preferably from 1 mass % to 5 mass %. When the content of the surfactant is 1 mass % or more, wettability for a non-porous substrate can be obtained, and image quality can be improved. When the content of the surfactant is 5 mass % or less, forming of the ink can be suppressed, and excellent discharge stability can be obtained. The surface tension of the ink can be controlled by adjusting the content of the surfactant. In the present ink set, the surface tension of each of the ink 1 and the ink 2 is preferably independently from 15 N/m to 30 N/m. When the surface tension is 15 N/m or less, it is difficult to suppress blurs occurred in printing on the lower layer. When the surface tension is 30 N/m or more, it is difficult to obtain wettability in printing on the substrate. It is preferable that the difference in the surface tension between the ink 1 and the ink 2 is relatively small. It is more preferable that difference in the surface tension between the ink 1 and the ink 2 is 1.0 N/m or less so that blurs and beading can be suppressed without effects from the value of the surface tension, and an excellent image can be obtained.

Specific examples of the surfactant include a silicone surfactant, a fluorosurfactant, an amphoteric surfactant, a nonionic surfactant, and an anionic surfactant. It is preferable to use a silicone surfactant that is hard to decompose under high pH as the silicone surfactant, but a silicone surfactant is not limited to, and suitable silicone surfactant can be selected and used. Specific examples of the silicon surfactant include side chain denatured polydimethylsiloxane, side chain denatured polydimethylsiloxane, side chain denatured polydimethylsiloxane, both-end denatured polydimethylsiloxane, one-terminal denatured polydimethylsiloxane, and side chain and both-end denatured polydimethylsiloxane, and a silicone surfactant having a polyoxyethylene group, and/or a polyoxyethylene polyoxypropylene group as a modifying group is preferable in terms of showing preferable particular as water based surfactant. Further, polyether modified silicone surfactant (e.g. a compound introduced a polyalkylene oxide structure to a side chain of Si of dimethylsiloxane) can be used as the silicone surfactant.

Preferable examples of fluorosurfactant include a perfluoroalkyl sulfonic acid compound, a perfluoroalkyl carboxylic acid compound, a perfluoroalkyl phosphate ester compound, a perfluoroalkyl ethylene oxide adduct, and a polyoxyethylene alkylene ether polymer compound having a polyoxyethylene alkyl ether group as a side chain in terms of low foamability. Specific examples of the perfluoroalkyl sulfonic acid compound include perfluoroalkyl sulfonic acid and perfluoroalkyl sulfonate. Specific examples of the perfluoroalkyl carboxylic acid compound include perfluoroalkyl carboxylic acid and perfluoroalkyl carboxylate. Specific examples of the polyoxyethylene alkylene ether polymer compound having a polyoxyethylene alkyl ether group as a side chain include sulfate of polyoxyethylene alkylene ether polymer having a polyoxyethylene alkyl ether group as a side chain and salt of polyoxyalkylene ether polymer having a polyoxyethylene alkyl ether group as a side chain.

Specific examples of the counter ion in the salt of a fluorosurfactant include Li, Na, K, $NH_4$, $NH_3CH_2CH_2OH$, $NH_2(CH_2CH_2OH)_2$, and $NH(CH_2CH_2OH)_3$.

In the present ink set, it is preferable to include silicone surfactant at from 1 mass % to 5 mass % so as to obtain high wettability for the substrate and image having higher quality.

Organic Solvent

Organic solvent is included to improve discharge stability from moisturizing effect and to improve osmosis to various kinds of recording mediums.

Water-soluble organic solvents are preferable as the organic solvent. The kinds of the water-soluble organic solvent is not limited but an amide base organic solvent is preferable because it has high wettability for the substrate and can improve beading property over the substrate. Preferable total content of water-soluble organic solvent in the ink is from 20 mass % to 70 mass %, and the total content of from 30 mass % to 60 mass % is more preferable. When the total content is 20 mass % or more, ink becomes hard to dry prior to printing and discharge stability can be easily obtained. When the total content is 70 mass % or less, viscosity of ink is not too high and good for discharging.

Specific examples of hydrosoluble organic solvents include the following.

(Polyols)
Ethylene glycol: SP value 33.0
1,2-propane diol: SP value 30.2
1,3-propane diol: SP value 31.7
1,2-butane diol: SP value 28.29
1,3-butane diol: SP value 28.94
2,3-butane diol: SP value 25.63
1,4-butane diol: SP value 31.31
2-methyl-2,4-pentane diol: SP value 26.86
Diethylene glycol: SP value 29.12
Triethylene glycol: SP value 27.5
Dipropylene glycol: SP value 26.42
2,2-dimethyl-1,3-propane diol: SP value 28.5
2-methyl-1,3-propane diol: SP value 30.35
1,2-pentane diol: SP value 28.5
2,4-pentane diol: SP value 28.29
1,5-pentane diol: SP value 29.11
1,6-hexane diol: SP value 25.2
2-ethyl-1,3-hexane diol: SP value 22.76
2,5-hexane diol: SP value 27.06
(Polyol Alkyl Ethers)
Dipropylene glycol monomethyl ether: SP value 19.95
Propylene glycol-n-butyl ether: SP value 18.4
Propylene glycol-t-butyl ether: SP value 19.7
Diethylene glycol methyl ether: SP value 23.0
Diethylene glycol ethyl ether: SP value 20.0
Diethylene glycol benzyl ether: SP value 28.58
Ethylene glycol-n-ether-propyl ether: SP value 22.76
Ethylene glycol-n-butyl-propyl ether: SP value 22.76
Dipropylene glycol-n-propyl ether: SP value 20.04
Tripropylene glycol methyl ether: SP value 19.3
Propylene glycol phenyl ether: SP value 24.19
Triethylene glycol methyl ether: SP value 21.8
Triethylene glycol ethyl ether: SP value 18.3
Triethylene glycol butyl ether: SP value 21.12
Diethylene glycol-n-hexyl ether: SP value
Ethylene glycol phenyl ether: SP value 25.4
3-methyl-3-methyl butanol: SP value 21.53
(Ethers)
Ethyl lactate: SP value 25.2
(Amides)
Formamide: SP value 36.7
N-methylformamide: SP value 30.1
N,N-dimethylformamide: SP value 24.86
N,N-dimethylbutyramide: SP value 20.22
Hexamethylphosphoramide: SP value 23.3
Methacrylamide: SP value 22.5
N-methyl-2-pyrrolidone: SP value 22.34
N-hydroxyethyl-2-pyrrolidone: SP value 23.58
2-pyrrolidone: SP value 28.4
ε-caprolactam: SP 24.12
(Amines)
Monoethanolamine: SP value 31.28
Diethanolamine: SP value 29.36
Triethanolamine: SP value 36.7
Monoethylamine: SP value 19.26
Triethylamine: SP value 17.8
(Sulfur-Containing Compounds)
Dimethyl sulfoxide: SP value 26.68
Sulfolane: SP value 29.4

Resin

Resin is included in the ink. The resin can be added as a resin particle and/or a resin emulsion where the resin particle is dispersed in liquid such as water, but not limited to these options.

In the present ink set, it is preferable that the content of resin particle in white ink is smaller than that of the other color inks. By this, excellent images without blurs can be obtained. It is preferable that the content of resin particle in white ink is from 0.1 mass % to 3 mass % smaller than that of the other color inks. The content of resin particle in each of the inks is preferably in a range of 3 mass % to 10 mass % so that high glossiness and stability of ink can be obtained. Preferable volume average diameter of resin particle is from 10 nm to 1000 nm, more preferably from 20 nm to 50 nm in terms of using for ink-jetrecording device. The volume average diameter of resin particle can be measured with a particle counter (Microtrac UPA, manufactured by NIKKISO CO., LTD.).

The type of resin particles are not limited to, and appropriate resin particles can be selected in accordance to the purpose. Specific examples of resin particles include urethane resin particle, polyester resin particle, acrylic resin particle, vinyl acetate resin particle, styrene resin particle, butadiene resin particle, styrene-butadiene resin particle, vinyl chloride resin particle, acrylic styrene resin, and acrylic silicone resin particle. Emulsion of urethane or acryl is preferable among these resin particles in terms of excellent fixity and ink stability. Dispersant such as surfactant cab be included in the resin particle as necessary, and it is preferable to use self-emulsifying resin particle so that ink showing higher coating performance can be obtained. In this case, it is preferable to use a self-emulsifying resin particle having anionic groups to an extent that acid value becomes from 5 mg KOH/g to 100 mg KOH/g in terms of water dispersiveness, and it is preferable to use a self-emulsifying resin particle having anionic groups to an extent that acid value becomes from 5 mg KOH/g to 50 mg KOH/g so as to add excellent rubfastness and chemical resistance. Excellent water dispersiveness can be obtained by using a carboxyl group or a sulfonate group as the anionic group. These anionic groups can be introduced to the resin particle by using monomers having an anionic group.

Both resin particles synthesized as necessary and resin particles on the market can be used as the resin particle. Specific examples of the resin particle on the market include SUPERFLEX 130 (polyether-base urethane resin particle, manufactured by DKS Co. Ltd.), JONCRYL 537 (acrylic resin particle, manufactured by BASF), MICROGEL E-1002, E-5002 (styrene acryl base resin particle, manufactured by Nippon Paint Holdings Co., Ltd.), VONCOAT 4001 (acryl base resin particle, manufactured by DIC Corporation), VONCOAT 5454 (styrene acryl base resin particle, manufactured by DIC Corporation), SAE-1014 (styrene acryl base resin particle, manufactured by Zeon Corporation), Saibinol SK-200 (acryl base resin particle, manufactured by Saiden Chemical Industry Co., Ltd.), Primal AC-22 and AC-61 (acrylic particulate resin, manufactured by Rohm and Haas), NANOCRYL SBCX-2821 and 3689 (Acrylic silicone particulate resin, manufactured by Toyo Ink Mfg. Co., Ltd.), and #3070 (methyl methacrylate polymer particulate resin from Mikuni Color Ltd.).

Other Additive Agents

Specific examples of other components that can optionally be added to the ink include antiseptic mildewproofing agent, antirust agent, and pH regulator.

Specific examples of antiseptic mildewproofing agent includes 1,2-benzisothiazolin-3-one, sodium benzoate, sodium dehydroacetate, sorbic acid sodium salt, sodium pentachlorophenolate, and 2-pyridinethiol-1-oxide sodium salt. These antiseptic mildewproofing agents can be used independently or in combination. Specific examples of the antirust agent includes acidity sulfites, sodium thiosulfate, ammonium thiodiglycolate, diisopropyl ammonium nitrate, pentaerythritol tetrahydrochloride, and decyclohexyl ammonium nitrate. The pH regulator is not limited to. Any material can be used as the pH regulator so far as it can regulate pH value as desired value without harmful effect on ink. Specific examples of pH regulator includes alkali metal element hydroxide such as lithium hydroxide, sodium hydroxide, and potassium hydroxide, alkali metal element carbonate such as lithium carbonate, sodium carbonate, and potassium carbonate, amine such as quaternary ammonium hydroxides, diethanolamine, and triethanolamine, ammonium hydroxide, and quaternary phosphonium hydroxide.

Ink-jet Recording Method

The ink-jet recording method includes discharging an ink, preferably ink 2 for the upper layer, over a substrate over which the another ink, preferably ink 1 for the lower layer, is discharged. Examples of the ink-jet recording method herein is a recording method including adding white ink including a white coloring agent as the ink 1 to a recording medium, and recording with an ink including a coloring agent other than the white coloring agent as the ink 2. Examples of the ink-jet recording method herein also includes a recording method including adding white ink including a white coloring agent as the ink 2 to a recording medium, and recording with an ink including a coloring agent other than the white coloring agent as the ink 1. It is possible to use black ink instead of white ink in the recording method. Specifically, examples of the ink-jet recording method herein is a recording method including adding black ink including a black coloring agent as the ink 1 to a recording medium, and recording with an ink including the other coloring agent than the black coloring agent as the ink 2. Examples of the ink-jet recording method herein also includes a recording method including adding black ink including a black coloring agent as the ink 2 to a recording medium, and recording with an ink including the other coloring agent than the black coloring agent as the ink 1. The ink 1 can include not only one kind of ink, an ink set of black ink and magenta ink can be used as the ink 1.

The step of adding ink 1 can be conducted by an ink-jet recording method or various kinds of coating methods. Specific examples of the coating method include a blade coating method, a gravure coating method, a gravure offset coating method, a bar coating method, a roll coating method, a knife coating method, an air knife coating method, a comma coating method, an U comma coating method, an AKKU coating method, a smoothing coating method, a micro gravure coating method, a reverse roll coating method, a 4 or 5-roll coating method, a curtain coating method, a slide coating method, and a die coating method.

The ink-jet recording method is preferable as a method of adding the ink 1 and the ink 2, and has an ink discharging step. The ink discharging step is jetting ink by adding stimulus to ink and printing. The means of jetting ink is not limited to, an appropriate means can be used as necessary. Various kinds of recording heads (ink discharge head) can be used as the means of jetting ink. Preferable recording head is a head having plural nozzle row and a sub tank for containing ink supplied from ink cartridge and for supplying the ink to the head. Preferable sub tank has a negative pressure generate equipment for generating negative pressure inside the sub tank, a pressure release equipment for releasing pressure, and a sensor for detecting existence of ink by difference in electro resistance.

The stimulation can be generated with stimulation generating equipment. The stimulation is not limited to and can be selected in accordance with the situation. Specific examples of the stimulation include heat (temperature), pressure, oscillation, and light. These stimulation can be used independently or in combination. Specific examples of the stimulation generating equipment include a heating device, a pressure device, a piezo-electric device, a vibration generating device, an ultrasonic wave oscillator, and light. More specifically, a piezoelectric actuator such as a piezoelectric element, a thermal actuator using phase change by boiling of liquid with electrothermal conversion element such as heat resistor element, a shape memory alloy actuator using metallic phase change according to temperature change, and an electrostatic actuator using electrostatic force.

A method of discharging the ink is not limited and depends on the kind of stimulus. When "heat" is used as the stimulus, the method of discharging the ink including heating the ink contained in a recording head by supplying thermal energy corresponding to recording signals with a thermal head, generate bubbles in the ink by the thermal energy, and jet the ink from nozzle holes of the recording head as liquid drops by pressure of the bubbles. When "pressure" is used as the stimulus, the method of discharging the ink including bending a piezo-electric element by applying voltage to the piezo-electric element configured to a pressure chamber provided at ink flow channel of a recording head, reducing capacity of the pressure chamber, and jeetting ink from nozzle holes of the recording head as liquid drops.

The method of applying voltage to the piezo-electric element is preferable. The piezo method is preferable method for discharging the ink including a resin particle because the piezo method does not generate heat. The piezo method is more preferable when ink containing humectant at small amount is used because ink clogging can be suppressed. It is preferable to perform empty scanning by applying voltage lower than the discharging voltage to the piezo-electric element so as to avoid dead pixels. It is preferable to discharge ink to ink tank before completing the empty scanning for 1 page. It is preferable to have a scraping equipment for scrapping ink adhered to saucer of empty discharge. A wiper and a cutter are preferable as the scraping equipment.

In the present method, a heating device can be provided so that the discharged ink 1 and the discharged ink 2 are easily spread over a substrate or a lower layer. Heating devices can be selected among known heating devices and used independently or in combination.

Specific examples of heating device includes a forced-air heating, a radiation heating, a conduction heating, a high-frequency dryer, and a microwave dryer. These heating devices can be provided inside or outside known inkjetprinter.

An inkjet recording device that is capable of recording using the ink of the present disclosure is described in detail with reference to the accompanying drawings. A recording method using a substrate having difficulty in osmosis is described, but recording on a osmosis substrate is conducted in a similar manner. Furthermore, the inkjet recording device includes a serial type (shuttle type) in which a carriage scans and a line type having a line type head. FIG. 1 is a schematic diagram illustrating an example of a serial type inkjet recording device.

As shown in FIG. 1, the inkjet recording device has a main body 101, a sheet feeding tray 102 installed onto the main body 101, a discharging tray 103, and an ink cartridge inserting portion 104. On the upper surface of the ink cartridge inserting portion 104 is arranged an operating unit 105 such as operation keys and a display. The ink cartridge inserting portion 104 has a front cover 115 that is openable and closable to detach and attach an ink cartridge 200. "111" represents an upper cover and "112" represents the front of the front cover.

Figure 2:
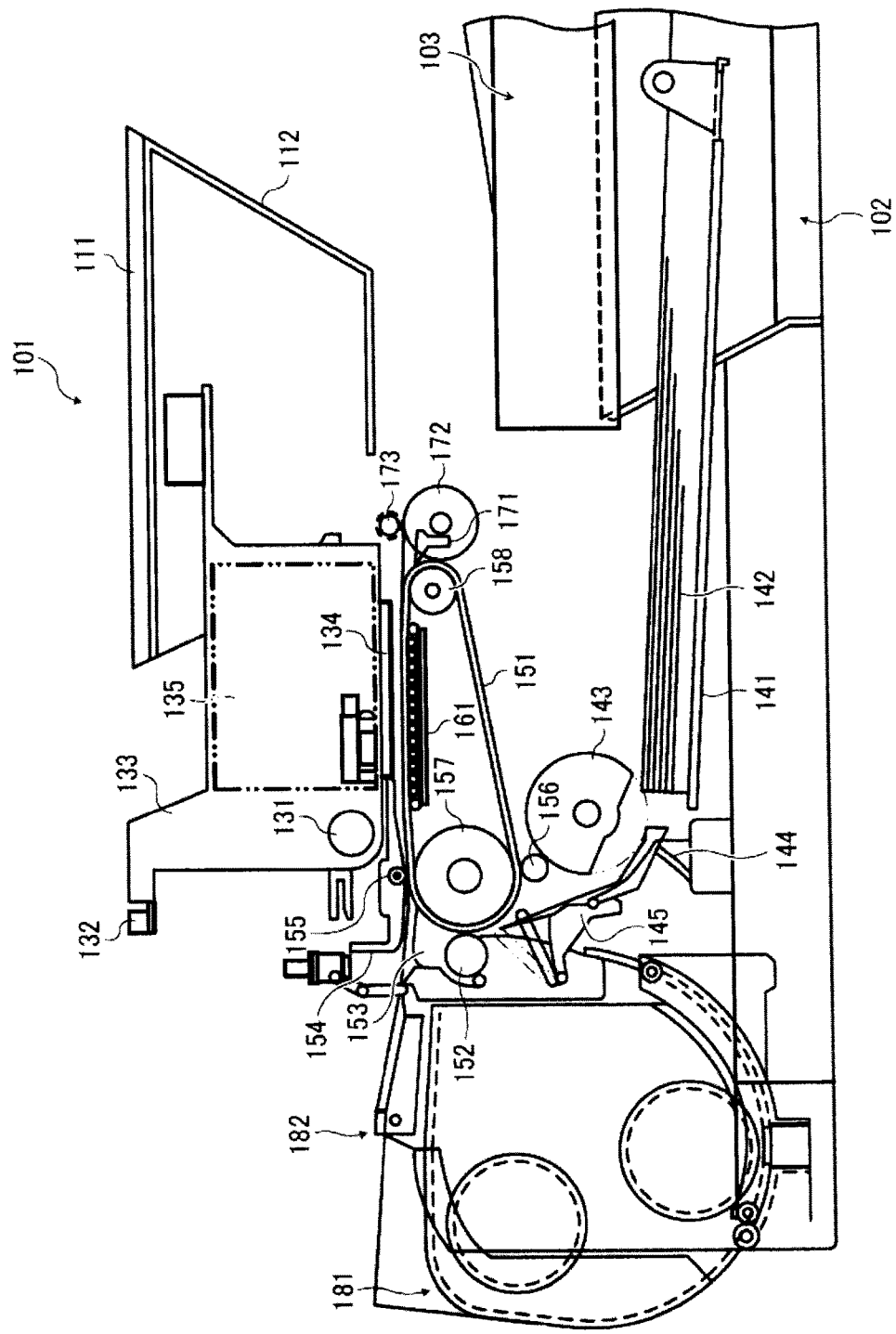
FIG. 2 is a schematic diagram illustrating the structure of the device illustrated in FIG. 1.

Inside the main body 101, as shown in FIG. 2, a guide rod 131 serving as a guiding member that laterally bridges side plates provided on the right side and left side and a stay 132 hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for colors to supply each color ink to the recording head 134. The ink for inkjet recording of the present disclosure is supplied and replenished to the sub tank 135 from the ink cartridge 201 mounted onto the ink cartridge inserting unit 104 via a tube for supplying ink.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased to the side of the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 has an endless form, stretched between a transfer roller 157 and a tension roller 158 and rotatable in the belt transfer direction. This transfer belt 151 include, for example, a top layer serving as a non-porous substrate adsorption surface made of a resin material such as a copolymer (ETFE) of tetra fluoroethylene and ethylene with no resistance control treatment while having a thickness about 40 μm and a bottom layer (moderate resistance layer, earth layer) made of the same material as the top layer with resistance control treatment with carbon.

On the rear side of the transfer belt 151, a guiding member 161 is arranged corresponding to the printing area by the recording head 134. A discharging unit to discharge the sheet 142 on which images are recorded by the recording head 134 includes a separation claw 171 to separate the sheet 142 from the transfer belt 151, a discharging roller 172, and a discharging roller 173. The sheet 142 is dried by heat wind by a fun heater 174 and thereafter output to a discharging tray 103 arranged below the discharging roller 172.

The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recording device, the sheet 142 is separated and fed from the sheet feeding unit one by one substantially vertically upward, guided by the guide 145, and transferred while being pinched between the transfer belt 151 and the counter roller 152.

Furthermore, the front end is guided by the transfer guide 153 and pressed against the transfer belt 151 by the front end pressure roller 155 to change the transfer direction substantially 90°. Since the transfer belt 157 is charged by the charging roller 156 at this point in time, the sheet 142 is electrostatically adsorbed to the transfer belt 151 and transferred.

By driving the recording head 134 according to the image signal while moving the carriage 133, the ink droplet is discharged to the sheet 142 not in motion to record an image for an amount corresponding to one line and thereafter the sheet 142 is transferred in a predetermined amount to conduct recording for the next line. On receiving a signal indicating that the recording completes or the rear end of the sheet 142 has reached the image recording area, the recording operation stops and the sheet 142 is discharged to the discharging tray 103.

In the present ink-jet method, a non-porous substrate is preferably used as a substrate to be printed. Specific examples of the non-porous substrate include a transparent or colored resin film, a laminated paper, and a coated paper, those examples have a surface formed by a non-porous materials (e.g. polyvinylchloride film, polyethylene terephthalate (PET) film, acrylic film, polypropylene film, polyimide film, and polystyrene film), that is, the non-porous substrates does not have paper component (e.g. wood-pulp paper, Japanese traditional paper, synthetic wood pulp, and synthetic fiber paper) on their surface. The inkjetrecording method herein can be applied to the various recording apparatus by an ink-jetmethod such as a printer, a facsimile, a copier, and a multifunction machine of a printer, a facsimile, and a copier.

EXAMPLES

The present ink set, method, etc. is explained more concretely by showing practical examples and comparative examples, but not limited to these practical examples. It is noted that the term "%" stands for "mass %" except for being used in evaluation standards.

SP values and surface tensions of each of the examples and the comparative examples are shown in Table 3, and these SP values are mix SP values ($\delta m$) calculated by the formula X. The surface tensions (mN/m) are measured by Automatic Surface Tensiometer (CBVP-Z, manufactured by Kyowa Interface Science Co., Ltd.) at 25±0.5° C.

<Preparation for Dispersion of Polymer Fine Particle Including Black Pigment>
Preparation for Polymer Solution A 1 L flask provided with a mechanical stirrer, a thermometer, a gas introduction path, a circulation tube, and a dropping funnel was purged with nitrogen gas, followed by 11.2 g of styrene, 2.8 g of acrylic acid, 12.9 g of lauryl methacrylate, 4.0 g of polyethylene glycol methacrylate, 4.0 g of styrene macromer, and 0.4 g of mercaptoethanol were mixed and heated to 65° C. A mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobismethylvaleronitrile, and 18 g of methylethylketone was dropped to the flask for 2.5 hours. After the dropping, a mixed solution of 0.8 g of azobismethylvaleronitrile and 18 g of methylethylketone was dropped to the flask for 0.5 hours. The dropped solution was aged at 65° C. for 1 hour, followed by 0.8 g of azobismethylvaleronitrile was added, and further aged for 1 hour.

After the reaction was finished, 364 g of methylethylketone was added, and 800 g of polymer solution A having density of 50% was obtained.

Preparation for a Polymer Fine Particle Dispersion Including Black Pigment 28 g of polymer solution A, 42 g of carbon black (manufactured by Degussa, FW100), 13.6 g of potassium hydroxide aqueous solution at 1 mol/L, 20 g of methyl ethyl ketone, and 13.6 g of water were sufficiently stirred and kneaded with a roll mill. The obtained paste was added into 200 g of pure water and was sufficiently stirred, and then, methyl ethyl ketone and water was removed with an evaporator, followed by pressure filtrating for this dispersion with a polyvinylidene fluoride membrane filter having average pore diameter of 5.0 μm to remove large particle, consequently, a polymer fine particle dispersion including black pigment at 15% of solid content of pigment and at 20% of solid content. The average particle diameter of the black pigment included in this dispersion was 110 nm.

Preparation for a Polymer Fine Particle Dispersion Including Magenta Pigment, Cyan Pigment, or Yellow Pigment Polymer fine particle dispersions including each of magenta pigment, cyan pigment, and yellow pigment was obtained in a similar manner to the preparation for polymer fine particle dispersion including black pigment except for that the following pigment was used instead of the black pigment. The average particle diameter of pigment included in each dispersions was 110 nm.

Magenta: Pigment Red 122 manufactured by Sun Chemical Corporation
Cyan: Cupper phthalocyanine pigment manufactured by TOYO INK CO., LTD. (C.I. pigment blue: 15.4, product name: LX4033)
Yellow: Yellow pigment manufactured by Dainichiseika Color & Chemicals Mfg. Co., Ltd. (pigment yellow 74, product name; Yellow NO. 46)

Preparation for a Polymer Fine Particle Dispersion Including White Pigment 25 g of titanium oxide, STR-100W (manufactured by SAKAI CHEMICAL INDUSTRY CO., LTD.), 5 g of dispersant, TEGO Dispers 651 (manufactured by Evonik), 70 g of water were mixed, and 0.3 mmφ of zirconia beads at 60% of filling ratio were dispersed for 5 minutes with a bead mill (Research Lab, manufactured by SHINMARU ENTER- PRISES CORPORATION), and a polymer fine particle dispersion including white pigment was obtained. The average particle diameter of the white pigment included in this dispersion was 230 nm.

Example 1

<Preparation for Black Ink (Bk)>

Materials listed in the following recipe were mixed and stirred, and then filtered with 0.2 μm of polypropylene filter, consequently black ink (Bk) was prepared. The term "residual quantity %" of water in the following recipe means quantity which is required to make the amount 100%.
(Recipe for Ink)
The polymer fine particle dispersion including black pigment: 15% (solid content 20%, solvent: water)
Polyether-base urethane resin emulsion, SUPERFLEX 130 (manufactured by DKS Co. Ltd., solid content: 35%, solvent: water): 15%
Polyether modified silicone surfactant, KF-351A: 3.0% (manufactured by Shin-Etsu Chemical Co., Ltd.)
Antiseptic mildewproofing agent, Proxel LV (manufactured by Avecia): 0.1% 1,3-butane diol (solvent 1): 30.12% (specific gravity $\rho=1.0053$ g/cm$^3$, SP value: 28.94) 1,2-propane diol (solvent 2): 10.05% (specific gravity $\rho=1.036$ g/cm$^3$, SP value: 30.2) N-hydroxyethyl-2-pyrrolidone (solvent 3): 20.08% (specific gravity $\rho=1.145$ g/cm$^3$, SP value: 23.58) Water (specific gravity $\rho=1$ g/cm$^3$, SP value: 47.80): residual quantity %

As noted above, the mix SP value (δm) can be calculated with the following formula X using the SP values of the organic solvents and the water included in a particular ink.

$$\delta m = \delta 1\varphi 1 + \delta 2\varphi 2 + \ldots + \delta N\varphi N (N \text{ is a natural number}) \quad X:$$

δ1, δ2, δN: SP value of each solvent components
φ1, φ2, φN: volume fraction of each solvent components The mix SP value is calculated using the numerical value of solvent components included in the ink at 3 mass % or more other than the surfactant.

<Preparation for Magenta Ink (M), Cyan Ink (C), and Yellow Ink (Y)>

Each of inks, M, C, and Y was prepared in a similar manner to the preparation for Bk Ink except for that the polymer fine particle dispersion including magenta pigment (solid content: 20%, solvent: water), the polymer fine particle dispersion including cyan pigment (solid content: 20%, solvent: water), or the polymer fine particle dispersion including yellow pigment (solid content: 20%, solvent: water) was used instead of the polymer fine particle dispersion including black pigment.

<Preparation for Magenta White Ink (W)>

White ink (W) was prepared in a similar manner to the preparation for Bk Ink except for the followings: the polymer fine particle dispersion including white pigment (solid content: 20%, solvent: water) instead of the polymer fine particle dispersion including black pigment, the content of the solvent 2 was modified to 15.05%, the content of the solvent 3 was modified to 5.08%, and the content of water was adjusted.

Example 2

Each of inks of example 2 was prepared in a similar manner to the preparation of each inks of the example 1 except for that SOFTANOL EP-5035 (manufactured by NIPPON SHOKUBAI CO., LTD.) was used instead of the surfactant used in the example 1.

Example 3

Each of inks of example 3 was prepared in a similar manner to the preparation of each inks of the example 1 except for the followings, the content of the solvent 2 in the Bk ink was modified to 15.05%, the content of the solvent 3 in the Bk ink was modified to 5.08%, the content of the solvent 2 in the W ink was modified to 10.05%, and the content of the solvent 3 in the W ink was modified to 20.08%.

Example 4

Each of inks of example 4 was prepared in a similar manner to the preparation of each inks, Bk, M, C, and Y of the example 1 except for that diethylene glycol methyl ether was used instead of the solvent 3 used in the example 1.

Example 5

Each of inks of example 5 was prepared in a similar manner to the preparation of each inks, Bk, M, C, and Y of the example 1 except for that acrylic resin emulsion (VON-COAT R-3380-E manufactured by DIC Corporation) was used instead of urethane resin emulsion used in the example 1.

Example 6

Each of inks of example 6 was prepared in a similar manner to the preparation of each inks, Bk, M, C, and Y of the example 1 except for that the content of the surfactant was modified to 5.0%.

Example 7

Each of inks of example 7 was prepared in a similar manner to the preparation of each inks, Bk, M, C, and Y of the example 1 except for that polyether modified silicone surfactant, KF-355A: 3.0% (manufactured by Shin-Etsu Chemical Co., Ltd.) was used instead of the surfactant used in the example 1.

Example 8

Each of inks, Bk, M, C, and Y of example 8 was prepared in a similar manner to the preparation of each inks, Bk, M, C, and Y of the example 1 except for that pigment dispersion including the following pigment was used instead of the pigment dispersion used in the example 1. The white ink is the same as the example 1.
Bk ink: Direct black 154
M ink: Acid Red 285
C ink: Direct Blue 199
Y ink: Direct Yellow 86

Example 9

Each of inks of example 9 was prepared in a similar manner to the preparation of each inks, Bk, M, C, Y, and W of the example 1 except for the followings, the content of the solvent 1 in each of inks, Bk, M, C, and Y was modified to 20.12%, the content of the solvent 3 in the W ink was modified to 10.08%, monoethylamine was further added as solvent 4 at 10.00% for Bk, M, C. and Y inks and at 5.00% for W ink.

Example 10

Each of inks of example 10 was prepared in a similar manner to the preparation of each inks, Bk, M, C, Y, and W of the example 1 except for that N,N-dimethylbutyramide was used instead of the solvent 3 used in the example 1.

Example 11

Each of inks of example 11 was prepared in a similar manner to the preparation of each inks, Bk, M, C, Y, and W of the example 1 except for that the content of the surfactant of each inks was modified to 1.0%.

Example 12

Each of inks of example 12 was prepared in a similar manner to the preparation of each inks, Bk, M, C, Y, and W of the example 1 except for that the content of the solvent 3 of the W ink was modified to 10.08%.

Example 13

Each of inks of example 13 was prepared in a similar manner to the preparation of each inks, Bk, M, C, Y, and W of the example 1 except for that the content of the solvent 1 of the W ink was modified to 25.12%.

Example 14

Each of inks of example 14 was prepared in a similar manner to the preparation of each inks, Bk, M, C, Y, and W of the example 1 except for that the content of the surfactant of the W ink was modified to 2.5%.

Comparative Example 1

Each of inks of comparative example 1 was prepared in a similar manner to the preparation of each inks, Bk, M, C, Y, and W of the example 1 except for that the content of the solvent 2 of the W ink was modified to 10.05% and that the content of the solvent 3 of the W ink was modified to 20.08%. That is, the SP values of the lower layer and the upper layer were made to be the same.

Comparative Example 2

Each of inks of comparative example 2 was prepared in a similar manner to the preparation of each inks, Bk, M, C, Y, and W of the example 1 except for the followings, the content of the solvent 2 of each inks, Bk, M, C, and Y was modified to 15.08%, the content of the solvent 3 of each inks, Bk, M, C, and Y was modified to 10.05%, the content of the solvent 2 of the W ink was modified to 10.05%, and the content of the solvent 3 of the W ink was modified to 20.08%. That is, the SP value of the lower layer is smaller than that of the upper layer.

Comparative Example 3

Each of inks of comparative example 3 was prepared in a similar manner to the preparation of each inks, Bk, M, C, Y, and W of the example 1 except for the followings, the content of the surfactant of each inks, Bk, M, C, Y, and W was modified to 0.5%, the content of the solvent 2 of the W ink was modified to 20.05%, and the content of the solvent 3 of the W ink was modified to 10.08%.

Comparative Example 4

Each of inks of comparative example 4 was prepared in a similar manner to the preparation of each inks, Bk, M, C, Y, and W of the example 1 except for that the content of the surfactant of each inks, Bk, M, C, Y, and W was modified to 8.0%, As for each of ink sets of the examples 1 to 14 and the comparative examples 1 to 4, kinds of inks, solvents, and surfactants for the lower and upper layers are shown in Tables 1 and 2. The unit of the values in the tables is "mass %", and abbreviations in the Tables 1 and 2 mean as the following.

(a) 1,3-butane diol
(b) 1,2-propane diol
(c) N-hydroxyethyl-2-pyrrolidone
(d) Diethylene glycol methyl ether (specific gravity $\rho=1.02$ g/cm$^3$, SP value: 20.0)
(e) N,N-dimethylbutyramide (specific gravity $\rho=1.145$ g/cm$^3$, SP value: 20.22)
(F) Monoethylamine (specific gravity $\rho=0.689$ g/cm$^3$, SP value: 19.26)
(g) KF-351A
(h) EP5035
(i) KF-355A

TABLE 1

| | Lower Layer | Ink | Solvent 1 | | Solvent 2 | | Solvent 3 | | Solvent 4 | Surfactant | |
|---|---|---|---|---|---|---|---|---|---|---|---|
| Ex. 1 | | Ink 2, Bk | (a) | 30.12 | (b) | 10.05 | (c) | 20.08 | — | (g) | 3.0 |
| | | Ink 2, M | (a) | 30.12 | (b) | 10.05 | (c) | 20.08 | — | (g) | 3.0 |
| | | Ink 2, C | (a) | 30.12 | (b) | 10.05 | (c) | 20.08 | — | (g) | 3.0 |
| | | Ink 2, Y | (a) | 30.12 | (b) | 10.05 | (c) | 20.08 | — | (g) | 3.0 |
| | ○ | Ink 1, W | (a) | 30.12 | (b) | 15.05 | (c) | 5.08 | — | (g) | 3.0 |
| Ex. 2 | | Ink 2, Bk | (a) | 30.12 | (b) | 10.05 | (c) | 20.08 | — | (h) | 3.0 |
| | | Ink 2, M | (a) | 30.12 | (b) | 10.05 | (c) | 20.08 | — | (h) | 3.0 |
| | | Ink 2, C | (a) | 30.12 | (b) | 10.05 | (c) | 20.08 | — | (h) | 3.0 |
| | | Ink 2, Y | (a) | 30.12 | (b) | 10.05 | (c) | 20.08 | — | (h) | 3.0 |
| | ○ | Ink 1, W | (a) | 30.12 | (b) | 15.05 | (c) | 5.08 | — | (h) | 3.0 |
| Ex. 3 | ○ | Ink 1, Bk | (a) | 30.12 | (b) | 15.05 | (c) | 5.08 | — | (g) | 3.0 |
| | | Ink 2, M | (a) | 30.12 | (b) | 10.05 | (c) | 20.08 | — | (g) | 3.0 |
| | | Ink 2, C | (a) | 30.12 | (b) | 10.05 | (c) | 20.08 | — | (g) | 3.0 |
| | | Ink 2, Y | (a) | 30.12 | (b) | 10.05 | (c) | 20.08 | — | (g) | 3.0 |
| | | Ink 2, W | (a) | 30.12 | (b) | 10.05 | (c) | 20.08 | — | (g) | 3.0 |
| Ex. 4 | | Ink 2, Bk | (a) | 30.12 | (b) | 10.05 | (d) | 20.08 | — | (g) | 3.0 |
| | | Ink 2, M | (a) | 30.12 | (b) | 10.05 | (d) | 20.08 | — | (g) | 3.0 |

TABLE 1-continued

| | Lower Layer | Ink | Solvent 1 | Solvent 2 | Solvent 3 | Solvent 4 | Surfactant |
|---|---|---|---|---|---|---|---|
| | | Ink 2, C | (a) 30.12 | (b) 10.05 | (d) 20.08 | — | (g) 3.0 |
| | | Ink 2, Y | (a) 30.12 | (b) 10.05 | (d) 20.08 | — | (g) 3.0 |
| | ○ | Ink 1, W | (a) 30.12 | (b) 15.05 | (d) 5.08 | — | (g) 3.0 |
| Ex. 5 | | Ink 2, Bk | (a) 30.12 | (b) 10.05 | (c) 20.08 | — | (g) 3.0 |
| | | Ink 2, M | (a) 30.12 | (b) 10.05 | (c) 20.08 | — | (g) 3.0 |
| | | Ink 2, C | (a) 30.12 | (b) 10.05 | (c) 20.08 | — | (g) 3.0 |
| | | Ink 2, Y | (a) 30.12 | (b) 10.05 | (c) 20.08 | — | (g) 3.0 |
| | ○ | Ink 1, W | (a) 30.12 | (b) 15.05 | (c) 5.08 | — | (g) 3.0 |
| Ex. 6 | | Ink 2, Bk | (a) 30.12 | (b) 10.05 | (c) 20.08 | — | (g) 5.0 |
| | | Ink 2, M | (a) 30.12 | (b) 10.05 | (c) 20.08 | — | (g) 5.0 |
| | | Ink 2, C | (a) 30.12 | (b) 10.05 | (c) 20.08 | — | (g) 5.0 |
| | | Ink 2, Y | (a) 30.12 | (b) 10.05 | (c) 20.08 | — | (g) 5.0 |
| | ○ | Ink 1, W | (a) 30.12 | (b) 15.05 | (c) 5.08 | — | (g) 5.0 |
| Ex. 7 | | Ink 2, Bk | (a) 30.12 | (b) 10.05 | (c) 20.08 | — | (i) 3.0 |
| | | Ink 2, M | (a) 30.12 | (b) 10.05 | (c) 20.08 | — | (i) 3.0 |
| | | Ink 2, C | (a) 30.12 | (b) 10.05 | (c) 20.08 | — | (i) 3.0 |
| | | Ink 2, Y | (a) 30.12 | (b) 10.05 | (c) 20.08 | — | (i) 3.0 |
| | ○ | Ink 1, W | (a) 30.12 | (b) 15.05 | (c) 5.08 | — | (i) 3.0 |
| Ex. 8 | | Ink 2, Bk | (a) 30.12 | (b) 10.05 | (c) 20.08 | — | (g) 3.0 |
| | | Ink 2, M | (a) 30.12 | (b) 10.05 | (c) 20.08 | — | (g) 3.0 |
| | | Ink 2, C | (a) 30.12 | (b) 10.05 | (c) 20.08 | — | (g) 3.0 |
| | | Ink 2, Y | (a) 30.12 | (b) 10.05 | (c) 20.08 | — | (g) 3.0 |
| | ○ | Ink 1, W | (a) 30.12 | (b) 15.05 | (c) 5.08 | — | (g) 3.0 |
| Ex. 9 | | Ink 2, Bk | (a) 20.12 | (b) 10.05 | (c) 20.08 | (f) 10.00 | (g) 3.0 |
| | | Ink 2, M | (a) 20.12 | (b) 10.05 | (c) 20.08 | (f) 10.00 | (g) 3.0 |
| | | Ink 2, C | (a) 20.12 | (b) 10.05 | (c) 20.08 | (f) 10.00 | (g) 3.0 |
| | | Ink 2, Y | (a) 20.12 | (b) 10.05 | (c) 20.08 | (f) 10.00 | (g) 3.0 |
| | ○ | Ink 1, W | (a) 20.12 | (b) 15.05 | (c) 10.08 | (f) 5.00 | (g) 3.0 |

TABLE 2

| | Lower Layer | | Solvent 1 | Solvent 2 | Solvent 3 | Solvent 4 | Surfactant |
|---|---|---|---|---|---|---|---|
| Ex. 10 | | Ink 2, Bk | (a) 30.12 | (b) 10.05 | (e) 20.08 | — | (g) 3.0 |
| | | Ink 2, M | (a) 30.12 | (b) 10.05 | (e) 20.08 | — | (g) 3.0 |
| | | Ink 2, C | (a) 30.12 | (b) 10.05 | (e) 20.08 | — | (g) 3.0 |
| | | Ink 2, Y | (a) 30.12 | (b) 10.05 | (e) 20.08 | — | (g) 3.0 |
| | ○ | Ink 1, W | (a) 30.12 | (b) 15.05 | (e) 5.08 | — | (g) 3.0 |
| Ex. 11 | | Ink 2, Bk | (a) 30.12 | (b) 10.05 | (c) 20.08 | — | (g) 1.0 |
| | | Ink 2, M | (a) 30.12 | (b) 10.05 | (c) 20.08 | — | (g) 1.0 |
| | | Ink 2, C | (a) 30.12 | (b) 10.05 | (c) 20.08 | — | (g) 1.0 |
| | | Ink 2, Y | (a) 30.12 | (b) 10.05 | (c) 20.08 | — | (g) 1.0 |
| | ○ | Ink 1, W | (a) 30.12 | (b) 15.05 | (c) 5.08 | — | (g) 1.0 |
| Ex. 12 | | Ink 2, Bk | (a) 30.12 | (b) 10.05 | (c) 20.08 | — | (g) 3.0 |
| | | Ink 2, M | (a) 30.12 | (b) 10.05 | (c) 20.08 | — | (g) 3.0 |
| | | Ink 2, C | (a) 30.12 | (b) 10.05 | (c) 20.08 | — | (g) 3.0 |
| | | Ink 2, Y | (a) 30.12 | (b) 10.05 | (c) 20.08 | — | (g) 3.0 |
| | ○ | Ink 1, W | (a) 30.12 | (b) 15.05 | (c) 10.08 | — | (g) 3.0 |
| Ex. 13 | | Ink 2, Bk | (a) 30.12 | (b) 10.05 | (c) 20.08 | — | (g) 3.0 |
| | | Ink 2, M | (a) 30.12 | (b) 10.05 | (c) 20.08 | — | (g) 3.0 |
| | | Ink 2, C | (a) 30.12 | (b) 10.05 | (c) 20.08 | — | (g) 3.0 |
| | | Ink 2, Y | (a) 30.12 | (b) 10.05 | (c) 20.08 | — | (g) 3.0 |
| | ○ | Ink 1, W | (a) 25.12 | (b) 15.05 | (c) 5.08 | — | (g) 3.0 |
| Ex. 14 | | Ink 2, Bk | (a) 30.12 | (b) 10.05 | (c) 20.08 | — | (g) 3.0 |
| | | Ink 2, M | (a) 30.12 | (b) 10.05 | (c) 20.08 | — | (g) 3.0 |
| | | Ink 2, C | (a) 30.12 | (b) 10.05 | (c) 20.08 | — | (g) 3.0 |
| | | Ink 2, Y | (a) 30.12 | (b) 10.05 | (c) 20.08 | — | (g) 3.0 |
| | ○ | Ink 1, W | (a) 30.12 | (b) 15.05 | (c) 5.08 | — | (g) 2.5 |
| Comp. Ex. 1 | | Ink 2, Bk | (a) 30.12 | (b) 10.05 | (c) 20.08 | — | (g) 3.0 |
| | | Ink 2, M | (a) 30.12 | (b) 10.05 | (c) 20.08 | — | (g) 3.0 |
| | | Ink 2, C | (a) 30.12 | (b) 10.05 | (c) 20.08 | — | (g) 3.0 |
| | | Ink 2, Y | (a) 30.12 | (b) 10.05 | (c) 20.08 | — | (g) 3.0 |
| | ○ | Ink 1, W | (a) 30.12 | (b) 10.05 | (c) 20.08 | — | (g) 3.0 |
| Comp. Ex. 2 | | Ink 2, Bk | (a) 30.12 | (b) 15.08 | (c) 10.05 | — | (g) 3.0 |
| | | Ink 2, M | (a) 30.12 | (b) 15.08 | (c) 10.05 | — | (g) 3.0 |
| | | Ink 2, C | (a) 30.12 | (b) 15.08 | (c) 10.05 | — | (g) 3.0 |
| | | Ink 2, Y | (a) 30.12 | (b) 15.08 | (c) 10.05 | — | (g) 3.0 |
| | ○ | Ink 1, W | (a) 30.12 | (b) 10.05 | (c) 20.08 | — | (g) 3.0 |
| Comp. Ex. 3 | | Ink 2, Bk | (a) 30.12 | (b) 10.05 | (c) 20.08 | — | (g) 0.5 |
| | | Ink 2, M | (a) 30.12 | (b) 10.05 | (c) 20.08 | — | (g) 0.5 |
| | | Ink 2, C | (a) 30.12 | (b) 10.05 | (c) 20.08 | — | (g) 0.5 |
| | | Ink 2, Y | (a) 30.12 | (b) 10.05 | (c) 20.08 | — | (g) 0.5 |
| | ○ | Ink 1, W | (a) 30.12 | (b) 20.05 | (c) 10.08 | — | (g) 0.5 |

TABLE 2-continued

| | Lower Layer | | Solvent 1 | | Solvent 2 | | Solvent 3 | Solvent 4 | Surfactant | |
|---|---|---|---|---|---|---|---|---|---|---|
| Comp. Ex. 4 | | Ink 2, Bk | (a) 30.12 | (b) 10.05 | (c) 20.08 | — | (g) | 8.0 | | |
| | | Ink 2, M | (a) 30.12 | (b) 10.05 | (c) 20.08 | — | (g) | 8.0 | | |
| | | Ink 2, C | (a) 30.12 | (b) 10.05 | (c) 20.08 | — | (g) | 8.0 | | |
| | | Ink 2, Y | (a) 30.12 | (b) 10.05 | (c) 20.08 | — | (g) | 8.0 | | |
| | ○ | Ink 1, W | (a) 30.12 | (b) 20.05 | (c) 10.08 | — | (g) | 8.0 | | |

The following particulars for the ink sets of the examples 1 to 4 and the comparative example 1 to 4 were evaluated and the results are shown in Table 3. The example 14 is an example where the content of the surfactant in the inks, Bk, M, C, and Y is different from the content of the surfactant in the W ink. In Table 1, "*" stands for that the surface tension of each the inks Bk, M, C, and Y is "21" and that the surface tension of the W ink is "22". Each of the inks were installed to the ink-jetprinter (manufactured by Ricoh, modified IPSiO GXe5500) which is modified so as to install each of the ink sets, and test patters having contiguous solid images in four colors were printed on each of a transparency PET sheet, LLPET1223 (manufactured by SAKURAI CO., LTD.) made of a non-porous substrate and a solid image. The test patterns were evaluated as follows.

<Blurs and Beading>

Charts for evaluation were printed on PET films where each inks marked "○" in the section of the lower layer in the Tables 1 and 2 is applied on the whole surface, and were dried at 80° C. for 1 hour. Test patterns were visually observed and degrees of image defects of blurs or beading were evaluated and classified into five grades in accordance with the following criteria.

[Criteria for Evaluating Blurs]
5: Blurs cannot be found.
4: An extremely slight blur is observed in some portions.
3: A slight blur is observed at the whole of boundary portions.
2: Blurs are observed at the whole of boundary portions.
1: Blurs are observed on the whole of band-like patterns.

[Criteria for Evaluating Beading]
5: Beading cannot be found.
4: An extremely slight beading is observed in some portions.
3: Beading is observed in some portions.
2: A slight beading is observed on the whole of the solid images.
1: Beading is observed on the whole of the solid images.

<Image Glossiness>

A solid image was printed on a PET film and dried at 80° C. for 1 hour. Glossiness of 60° at a solid image part was measured four times with a glossiness meter (manufactured by BYK-Gardner, 4501) and an average value was calculated. Higher value of glossiness stands for having more excellent gloss, and glossiness of 80 is resistant to a practical use.

TABLE 3

| | SP Value of the Lower Layer | SP Value of the Upper Layer | Difference between SP values | Surface Tension | Blurs on the Substrate | Blurs on the Lower Layer | Beading on the Substrate | Beading on the Lower Layer | Image Glossiness |
|---|---|---|---|---|---|---|---|---|---|
| Ex. 1 | 36.85 | 33.56 | 3.29 | 21 | 5 | 5 | 5 | 5 | 90 |
| Ex. 2 | 36.85 | 33.56 | 3.29 | 18 | 3 | 4 | 4 | 5 | 82 |
| Ex. 3 | 36.85 | 33.56 | 3.29 | 21 | 5 | 4 | 5 | 3 | 80 |
| Ex. 4 | 36.85 | 33.56 | 3.29 | 21 | 4 | 5 | 3 | 4 | 90 |
| Ex. 5 | 36.85 | 33.56 | 3.29 | 21 | 5 | 5 | 5 | 5 | 80 |
| Ex. 6 | 36.60 | 33.24 | 3.36 | 16 | 4 | 4 | 4 | 5 | 90 |
| Ex. 7 | 36.85 | 33.56 | 3.29 | 22 | 5 | 5 | 5 | 5 | 90 |
| Ex. 8 | 36.85 | 33.56 | 3.29 | 21 | 5 | 5 | 5 | 4 | 92 |
| Ex. 9 | 35.94 | 32.56 | 3.38 | 21 | 5 | 5 | 5 | 4 | 88 |
| Ex. 10 | 36.63 | 32.72 | 3.91 | 21 | 5 | 4 | 5 | 5 | 90 |
| Ex. 11 | 37.09 | 33.56 | 3.53 | 28 | 5 | 5 | 4 | 5 | 90 |
| Ex. 12 | 35.68 | 33.56 | 2.12 | 21 | 5 | 5 | 5 | 4 | 90 |
| Ex. 13 | 37.90 | 33.56 | 4.34 | 21 | 5 | 5 | 5 | 5 | 90 |
| Ex. 14 | 36.91 | 31.27 | 5.64 | * | 5 | 5 | 5 | 5 | 90 |
| Comp. Ex. 1 | 33.56 | 33.56 | 0.08 | 21 | 5 | 1 | 5 | 4 | 82 |
| Comp. Ex. 2 | 33.56 | 35.41 | −1.85 | 21 | 5 | 5 | 4 | 4 | 75 |
| Comp. Ex. 3 | 34.79 | 33.94 | 0.85 | 32 | 5 | 5 | 2 | 2 | 84 |
| Comp. Ex. 4 | 33.66 | 32.74 | 0.92 | 13 | 2 | 2 | 5 | 5 | 80 |

It was confirmed from the results of Table 3 (mix SP values provided) that the ink set herein can provide images having high glossiness but not having blurs on the lower ink layer or the substrate.

As used herein the terms comprises, comprising, composed of, contains, containing, and terms similar thereto, when referring to the ingredients, parts, reactants, etc., of an ink composition, component, etc., to method steps, etc., mean, in their broadest sense, "includes at least" (i.e., comprises) but also include within their definition all those gradually restricted meanings until and including the point where only the enumerated materials or steps are included (e.g., consisting essentially of and consisting of).

The above written description provides a manner and process of making and using it such that any person skilled in this art is enabled to make and use the same, this enablement being provided in particular for the subject matter of the preferred embodiments below and for the appended claims, which make up a part of the original description:

Embodiment 1. An ink set comprising a first ink and a second ink, wherein each of the first ink and the second ink independently comprise:
a coloring agent,
a surfactant,
an organic solvent,
a resin, and
water,
wherein the content of the surfactant in the first ink and the second ink is independently from 1 to 5 mass % with respect to the total mass % of each of the first and second inks;
wherein the surface tension of each of the first and second inks is independently in a range of 15-30 N/m; and
wherein the mix SP value of a mixture of the organic solvent and the water of the first ink is larger than the mix SP value of a mixture of the organic solvent and the water of the second ink.

Embodiment 2. The ink set according to embodiment 1, wherein the surfactant in each of the first and second inks independently is a silicone surfactant.

Embodiment 3. The ink set according to embodiment 1, wherein the resin in each of the first and second inks is independently a urethane resin.

Embodiment 4. The ink set according to embodiment 1, wherein the organic solvent in each of the first and second inks independently is an amide base organic solvent.

Embodiment 5. An ink-jet recording method, comprising providing a first ink on a recording medium, and applying a second ink on top of the first ink, wherein each of the first ink and the second ink independently comprise:
a coloring agent,
a surfactant,
an organic solvent,
a resin, and
water,
wherein the content of the surfactant in the first ink and the second ink is independently from 1 to 5 mass % with respect to the total mass % of each of the first and second inks;
wherein the surface tension of each of the first and second inks is independently in a range of 15-30 N/m; and
wherein the mix SP value of a mixture of the organic solvent and the water of the first ink is larger than the mix SP value of a mixture of the organic solvent and the water of the second ink.

As used herein, the phrases "selected from the group consisting of," "chosen from," and the like include mixtures of the specified materials. The term "mentioned" notes exemplary embodiments, and is not limiting to certain species. As used herein the words "a" and "an" and the like carry the meaning of "one or more." Thus, and for example, a coloring agent, a surfactant, an organic solvent, a resin, etc. means one or more coloring agents, one or more surfactants, one or more organic solvents, one or more resins, etc. When a polymer is referred to in shorthand notation as comprising a monomer (or like phrases), the monomer is present in the polymer in polymerized form. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

What is claimed is:

1. An ink-jet recording method, comprising providing a first ink on a recording medium, and applying a second ink on top of the first ink, wherein each of the first ink and the second ink independently comprise:
a coloring agent,
a surfactant,
an amide base organic solvent,
a resin, and
water,
wherein the content of the surfactant in the first ink and the second ink is independently from 1 to 5 mass % with respect to the total mass % of each of the first and second inks,
wherein the surface tension of each of the first and second inks is independently in a range of 15-30 N/m, and
wherein the mix SP value of a mixture of the amide base organic solvent and the water of the first ink is larger than the mix SP value of a mixture of the amide base organic solvent and the water of the second ink by a value of at least 2.0.

2. The ink-jet recording method according to claim 1, wherein the surfactant in each of the first and second inks independently is a silicone surfactant.

3. The ink-jet recording method according to claim 1, wherein the resin in each of the first and second inks independently is a urethane resin.

4. The method according to claim 1, wherein the mix SP value of a mixture of the amide base organic solvent and the water of the first ink is larger than the mix SP value of a mixture of the amide base organic solvent and the water of the second ink by a value of at least 3.0.

5. The method according to claim 1, wherein the mix SP value of a mixture of the amide base organic solvent and the water of the first ink is larger than the mix SP value of a mixture of the amide base organic solvent and the water of the second ink by a value of 3.0-6.0.

6. The method according to claim 1, wherein a total content of amide base organic solvent in the first and second ink is from 20 mass % to 70 mass %.

7. The method according to claim 1, wherein a total content of amide base organic solvent in the first and second ink is from 30 mass % to 60 mass %.

8. The method according to claim 1, wherein the first ink and the second ink independently comprise at least one of formamide, N-methylformamide, N,N-dimethylformamide, N,N-dimethylbutyramide, hexamethylphosphoramide, methacrylamide, N-metyl-2-pyrrolidone, N-hydroxyethyl-2-pyrrolidone, 2-pyrrolidone, and ε-caprolactam.

9. The method according to claim 1, wherein one of the first ink and the second ink is a white ink and the other of the first ink and the second ink is a non-white ink.

10. The method according to claim 1, wherein the mix SP value of the mixture of the amide base organic solvent and the water of the first ink is larger than the mix SP value of a mixture of the amide base organic solvent and the water of the second ink by a value of 2.0-6.0.

11. The method according to claim 10, wherein a total content of amide base organic solvent in the first and second ink is from 20 mass % to 70 mass %.

12. The method according to claim 10, wherein a total content of amide base organic solvent in the first and second ink is from 30 mass % to 60 mass %.

13. The method according to claim 10, wherein the first ink and the second ink independently comprise at least one of formamide, N-methylforamide, N,N-dimethylformamide, N,N-dimethylbutyramide, hexamethylphosphoramide, methacrylamide, N-metol-2-pyrrolidone, N-hydroxyethyl-2-pyrrolidone, 2-pyrrolidone, and ε-caprolactam.

14. An ink-jet set, comprising a first ink and a second ink, wherein each of the first ink and the second ink independently comprise:
- a coloring agent,
- a surfactant,
- one or more organic solvents,
- a resin, and
- water,
- wherein one of the first ink and the second ink is a white ink and the other of the first ink and the second ink is a non-white ink,
- wherein the content of the surfactant in the first ink and the second ink is independently from 1 to 5 mass % with respect to the total mass % of each of the first and second inks,
- wherein the surface tension of each of the first and second inks is independently in a range of 15-30 N/m, and
- wherein the mix SP value of the one or more organic solvents and the water included in the first ink is larger than the mix SP value of the one or more organic solvents and the water included in the second ink.

15. The ink-jet set of claim 14, wherein the one or more organic solvents and the water included in the first ink is larger than the mix SP value of the one or more organic solvents and the water included in the second ink by a value of at least 2.0.

16. An ink-jet recording method, comprising providing a first ink on a recording medium, and applying a second ink on top of the first ink, wherein each of the first ink and the second ink independently comprise:
- a coloring agent,
- a surfactant,
- one or more organic solvents,
- a resin, and
- water,
- wherein one of the first ink and the second ink is a white ink and the other of the first ink and the second ink is a non-white ink,
- wherein the content of the surfactant in the first ink and the second ink is independently from 1 to 5 mass % with respect to the total mass % of each of the first and second inks,
- wherein the surface tension of each of the first and second inks is independently in a range of 15-30 N/m, and
- wherein the mix SP value of the one or more organic solvents and the water included in the first ink is larger than the mix SP value of the one or more organic solvents and the water included in the second ink.

17. The method according to claim 16, wherein the one or more organic solvents and the water included in the first ink is larger than the mix SP value of the one or more organic solvents and the water included in the second ink by a value of at least 2.0.

* * * * *